Patented Aug. 22, 1950

2,520,090

UNITED STATES PATENT OFFICE 2,520,090

POLYPHOSPHATES OF DIVALENT ARYL HYDROCARBONS

Gerald R. Barrett, Winchester, Mass., assignor to Monsanto Chemical Company, St. Louis, Mo., a corporation of Delaware No Drawing. Application December 30, 1947, Serial No. 794,799

6 Claims. (Cl. 260—461)

1

This invention relates to the preparation of polyphosphate compounds, and particularly to the preparation of polyphosphate compounds having unusual plasticizing properties.

It is a primary object of the invention to prepare polyphosphate compounds of the type described which are thoroughly compatible with nitrocellulose and other cellulose derivatives, such as ethyl cellulose, cellulose aceto-butyrate, and the like and which are characterized by low solubility in mineral oils and other petroleum hydrocarbons.

A further object of the invention is to prepare plasticizing compounds of the type described which are adapted to impart flame resistant properties to the cellulose derivatives to which they are added and which are characterized by being relatively non-volatile.

Still further objects and advantages of the invention will appear from the following description and appended claims.

The objects of the invention are accomplished in general by reacting a mixture of monohydric and dihydric phenols with sufficient phosphorus pentachloride or phosphorus oxychloride or mixtures thereof to form a neutral product. The molar ratio of monohydric phenol to dihydric phenol used should be 4 to 1 in order to obtain compounds of suitable plasticizing properties. When the molar ratio of mono and dihydric phenols employed is 4 to 1, two mols of the phosphorus halide compound should be used in order to obtain neutral compounds of the desired characteristics.

Polyphosphate compounds are described in the Arvin Patent No. 2,058,394, which for example include the reaction product of dihydroxyphenyl dimethyl methane, phenol and phosphorus oxychloride. The reacting materials employed by Arvin, however, are used in different proportions, that is, the molar proportions of mono and dihydric phenols used are much lower than those employed in accordance with this invention, and in general compounds are obtained which are resinous in character and acid in reaction. Thus, the compounds prepared by Arvin are more complex in chemical structure than those contemplated by the present invention and are not suitable for use as plasticizing agents in nitrocellulose or other cellulose derivative compositions.

2

By proceeding in accordance with the present invention compounds of the following general formula are prepared:

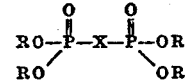

wherein X represents a dihydric phenol residue, and R represents an aryl radical.

The dihydric phenols which may be used to prepare compounds of the above nature include resorcinol, hydroquinone and polynuclear phenols such as diphenylol methane, diphenylol dimethyl methane, dihydroxy diphenyl, p,p' dihydroxy diphenyl sulfone and dihydroxyl naphthalene. The monohydric phenols which may be used include phenol, cresol, xylenol, tertiary butyl phenol and the like.

If desired, the dihydric phenol may be formed in the reaction mixture by adding suitable molecular proportions of monohydric phenol and an aldehyde, such as formaldehyde, acetaldehyde or the like. Thus, when the ratio of mono and dihydric phenol desired is 4 to 1, six mols of phenol would be reacted with one mol of aldehyde and sufficient phosphorus halide to produce a neutral compound, i. e. two mols. Two mols of the phenol would then react in situ with the aldehyde to form a dihydric phenol, which in turn reacts with the four remaining mols of phenol and the phosphorus compound to produce the desired end product. In such instances, it is essential that a relatively large proportion of the phosphorus halide employed be phosphorus pentachloride, which is converted to phosphorus oxychloride by reaction with the water formed as a result of the phenol-aldehyde condensation.

A further understanding of the invention will be obtained from the following examples of methods of preparing the polyphosphate compounds of the type described.

Example I

Two hundred and fifty grams of phosphorus oxychloride were mixed with 20 grams of phosphorus pentachloride and 1.5 grams of AlCl₃ and heated under reflux. Over a period of two hours, while the mixture was heated under reflux, 55 grams of resorcinol were added in small increments. Heating under reflux was continued until the evolution of HCl ceased, after which the excess phosphorus oxychloride was distilled off. To the residue, which was maintained at 100 to 125° C., 188 grams of phenol were then added in the course of an hour. The mixture was then heated for about four hours at 150° C., after which the resulting product was purified by washing repeatedly with 500 c. c. portions of 0.5 N NaOH, followed by removal of volatiles by vacuum distillation.

By proceeding in the above manner the resorcinol reacts first with the phosphorus oxychloride as follows:

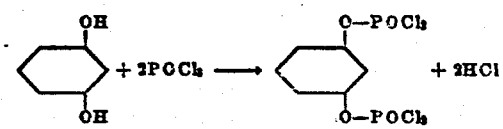

In the final step the intermediate product formed as above is converted to resorcinyl tetraphenyl diphosphate as follows:

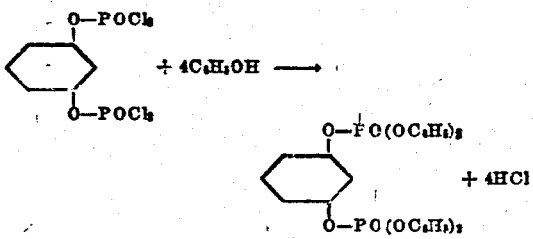

The phosphorus pentachloride and AlCl₃ were employed to promote the reaction by catalysis and reaction with any traces of moisture.

Example II

Two hundred and four grams of phosphorus oxychloride were mixed with 20 grams of phosphorus pentachloride and 1.5 grams of AlCl₃ and heated under reflux. Seventy-six grams of diphenylol dimethyl methane were then added to the mixture in small increments over a period of two hours, while heating the mixture under reflux. The heating under reflux was continued until the evolution of HCl ceased, after which the excess phosphorus oxychloride was distilled off. One hundred and twenty-five grams of phenol were then added to the residue in the course of an hour, while maintaining the residue at a temperature of 100 to 125° C. The mixture was then heated for about four hours at 150° C., after which the product was purified in the manner described in Example I. The product thus obtained was a light brown viscous liquid of negative chlorine and monophosphate content, which contained 1 to 2% volatile material. The yield was 92% based on the theoretical 100% conversion of the diphenol to the desired diphosphate.

Example III

Twenty-two and eight tenths grams of diphenylol dimethyl methane were mixed in a suitable reaction vessel with 20 grams of phenol, 29 grams of phosphorus oxychloride and 2.4 grams of phosphorus pentachloride, after which the mixture was heated in an oil bath for 1½ hours, during which time the temperature of the bath was gradually raised to 150° C. After cooling the material and replacing the HCl in the system with dry air, 20 grams more of phenol were added, and the mixture was heated at 210° C. for about 3 hours or until the evolution of HCl had practically ceased. The resulting material was dissolved in benzol, washed with a concentrated K₂CO₃ solution and dried over K₂CO₃, after which the benzyl was removed by distillation. The product thus obtained consisted of 48 grams of a dark straw colored oil, or essentially 100% of theory. The oil was insoluble in kerosene and compatible with nitrocellulose in all proportions.

Example IV

Three and three tenths grams of powdered paraform were suspended in 40 grams of melted phenol contained in a suitable reaction vessel, after which 16.5 grams of phosphorous oxychloride were added and the resulting mixture was warmed cautiously. Upon completion of the reaction, the mixture was cooled and 23 grams of phosphorus pentachloride were added and allowed to react. Finally 20 grams of additional phenol were added and the mixture was heated in an oil bath until the evolution of HCl practically ceased. The maximum temperature reached up to this point in the reaction was 130° C., and then the reaction was completed by heating the mixture with the bath at 200 to 230° C. The resulting mixture was further treated as described in Example III, and as a result 60 grams (representing a 95% yield) of a very viscous, pale straw-colored oil was obtained, which was compatible with nitrocellulose in all proportions.

If desired, the products prepared in accordance with the above examples may be decolorized in alcohol solution with activated carbon. The methods used in Examples I and II, in which the diphenol is first reacted with an excess of phosphorus oxychloride before adding the monohydric phenol, are preferred, since these methods result in products which are completely or substantially free of the monophosphate.

Although in general the plasticizers prepared as described herein have been described as useful primarily in cellulose derivative compositions, it is to be understood that they may also be used effectively as plasticizers in other materials, as for example in synthetic rubber compositions, polyvinyl chloride and copolymers of vinyl chloride with other vinyl monomers.

This application is a continuation-in-part of my copending application Serial No. 497,057 filed August 2, 1943, now abandoned.

What is claimed is:

1. A plasticizing agent consisting of a polyphosphate compound of the following general formula:

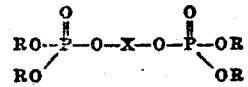

wherein X is a divalent aryl hydrocarbon radical in which each free valence stems from an aryl nucleus and R represents a mononuclear aryl hydrocarbon radical.

2. A plasticizing agent consisting of a polyphosphate compound having the following formula:

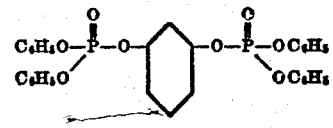

3. A plasticizing agent consisting of a polyphosphate compound having the following formula:

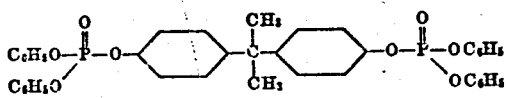

4. A plasticizing agent consisting of a polyphosphate compound having the following formula:

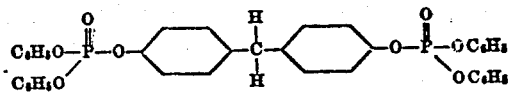

5. A plasticizing agent consisting of a polyphosphate compound having the following formula:

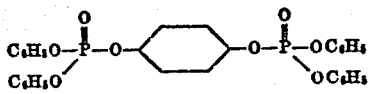

6. The method of preparing a plasticizing agent having the general formula:

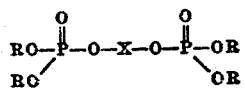

which comprises heating 1 molar proportion of a dihydric phenol of the formula HO—X—OH, where X is a divalent aryl hydrocarbon radical in which each free valence stems from an aryl nucleus, with 2 molar proportions of $POCl_3$ until 2 molar proportions of HCl are evolved, then adding 4 molar proportions of a monohydric phenol of the formula ROH, where R represents a mononuclear aryl hydrocarbon radical, and heating until a product of the above general formula is formed.

GERALD R. BARRETT.

REFERENCES CITED

The following references are of record in the file of this patent:

UNITED STATES PATENTS

| Number | Name | Date |
|---|---|---|
| 1,748,675 | Lommel et al. | Feb. 25, 1930 |
| 2,058,394 | Arvin | Oct. 27, 1936 |
| 2,151,680 | Britton et al. | Mar. 28, 1939 |
| 2,234,379 | Martin | Mar. 11, 1941 |
| 2,272,666 | Honel | Feb. 10, 1942 |

OTHER REFERENCES

Knauer, "Ber. deutsch. Chem. Ges.," vol. 27 (1894), pp. 2566-2569.